(12) United States Patent
Wang et al.

(10) Patent No.: US 7,496,730 B2
(45) Date of Patent: Feb. 24, 2009

(54) SYSTEM AND METHOD FOR REDUCING THE NUMBER OF TRANSLATION BUFFER INVALIDATES AN OPERATING SYSTEM NEEDS TO ISSUE

(75) Inventors: Landy Wang, Redmond, WA (US); Arun Kishan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 225 days.

(21) Appl. No.: 11/107,013

(22) Filed: Apr. 15, 2005

(65) Prior Publication Data

US 2006/0236070 A1    Oct. 19, 2006

(51) Int. Cl.
*G06F 12/00*    (2006.01)
(52) U.S. Cl. .................. 711/206; 711/156; 711/207
(58) Field of Classification Search .......... 711/135, 711/203, 206, 144, 156, 207
See application file for complete search history.

(56) References Cited

OTHER PUBLICATIONS

IBM Technical Disclosure Bulletin NB9011428, Low-Synchronization Translation Lookaside Buffer Consistency Algorithm, Nov. 1, 1990.*
Virtual Memory Systems, by J.W. Anderson and B.D. Shriver, pp. 29-45 in Encyclopedia of Computer Science and Technology, vol. 14, 1980, Marcel Dekker, Inc.*

\* cited by examiner

*Primary Examiner*—Matt Kim
*Assistant Examiner*—John P Fishburn
(74) *Attorney, Agent, or Firm*—Wolf, Greenfield & Sacks, P.C.

(57) ABSTRACT

Access bit contained in a page table entry is utilized for reducing the number of translation buffer flushes that an operating system needs to issue. A translation buffer flush occurs only when a page table entry is to become invalid and the Access bit of the page table entry is set.

12 Claims, 3 Drawing Sheets

SYSTEM AND METHOD FOR REDUCING THE NUMBER OF TRANSLATION BUFFER INVALIDATES AN OPERATING SYSTEM NEEDS TO ISSUE

FIELD OF THE INVENTION

The present invention relates to computer software and, more particularly, to enhancing the performance of a computer system.

BACKGROUND OF THE INVENTION

The development of computer systems has allowed increasing complexity and size of software applications, which in turn placed higher demands on the performance of the computer systems. Consequently, techniques have been developed to expand the performance capacity of computer systems. For example, a computer system may include more than one central processing unit ("CPU") to increase the computer system's processing power. FIG. 1 illustrates a single computer system 100. The computer system 100 includes a main memory 102, and one or more CPUs such as the representative CPU A 104A and CPU Z 104Z. The main memory 102 contains code and data necessary for the operation of the one or more CPUs in the computer system 100. The main memory 102 is only addressable by physical addresses.

The increasing demands placed on a computer system also have increased the amount of addressable memory available on a computer system. Increasing the amount of addressable memory enables a computer system to operate on more information and more complex software programs. One technique for increasing the addressable memory of a computer system is to provide a virtual memory system. A virtual memory system simulates an addressable memory that can be much larger than the main memory that a computer system actually has. A CPU produces virtual addresses that are translated, via hardware and software, to physical addresses, which can be used to access the main memory via a process of memory mapping.

The translation from a virtual address to a physical address is usually implemented by a memory management unit ("MMU"). As shown in FIG. 1, each CPU in the computer system 100 interfaces with the main memory 102 via a MMU. For example, the representative CPU A 104A communicates with the main memory 102 via a MMU A 106A. The MMU A 106A is capable of translating a virtual address issued by the CPU A 104A into a corresponding physical address, which is then used to access the original requested memory location in the main memory 102.

A MMU may translate a virtual address into a physical address by referencing data structures, such as translation tables, stored in main memory. FIG. 2 is a block diagram illustrating an exemplary conventional implementation of translating a virtual address 202 into its corresponding physical address by a MMU. FIG. 2 is discussed with reference to the computer system 100 illustrated in FIG. 1. Upon receiving the virtual address 202, a MMU in the computer system 100, such as the MMU A 106A, first references a page directory 204 in the main memory 102. A page directory 204 contains multiple entries, each of which maps to a page table. For example, an entry 208 in the page directory 204 maps to a page table 206. A page table contains the physical address information required to translate a virtual address to its corresponding physical address. Often, available physical memory is divided into a plurality of pages. Each entry of a page table is mapped with an individual physical page. For example, the page table entry ("PTE") 210 in the page table 206 points to a physical page 212 in the main memory 102.

Consequently, to translate a virtual address 202 into its corresponding physical address, a MMU needs to have at least one reading of the page directory 204 and one reading of the page table 206. In some implementations, more layers of page directories and page tables may be provided. As a result, translating a virtual address into its corresponding physical address may consume a significant amount of system clock time as well as bus bandwidth; and therefore, may cause undesirable delay for the operation of a CPU.

Thus, alternatively, a MMU uses cache-like memories such as translation buffers ("TB") to speed up the process of translating a virtual address into a physical address. For example, as shown in FIG. 1, each MMU in the computer system 100 contains a TB. For instance, the MMU A 106A includes a TB A 108A.

A TB is a cache that keeps track of recently used address mappings between a virtual address and a physical address. As shown in FIG. 3, a MMU can translate a virtual address 202 into its corresponding physical address 302 by first looking into a TB 304. If the virtual address 202 has been used recently, then the TB 304 probably holds information concerning the mapping between the virtual address 202 and its corresponding physical address 302. If the TB 304 does hold the needed information, the TB 304 can quickly provide the physical address 302 for the virtual address 202, thus eliminating the need for the MMU to spend several clock cycles accessing the page directory 204 and the page table 206 in the main memory 102. This occurrence is usually referred to as "TB hit." On the other hand, when the TB 304 cannot provide a physical address 302 for the virtual address 202, a "TB miss" occurs. The MMU then needs to access the page directory 204 and the page table 206 in the main memory 102, as illustrated in FIG. 2, for the purpose of updating the TB 304. Such a process is usually referred to as a "TB fetch." Referring back to FIG. 2, the PTE 210 also contains a V bit 214 and an A bit 216. The V bit ("Valid bit") 214 indicates whether the mapping in the PTE 210 is valid. The A bit ("Access bit") 216 indicates whether the PTE 210 has been accessed by, for example, a MMU in the computer system 100. At times, the mapping between a virtual address 202 and its corresponding physical page address 212 may change. For example, the PTE 210 may no longer be mapped to the physical address page 212. In such a case, the Valid bit 214 is cleared, signaling that the mapping between the virtual address 202 and the physical page address 212 is no longer valid. At times, the access right on the physical page address 212 is changed, for example, from a read-and-write permission to a read-only permission; and/or the virtual-physical address mapping changes, i.e., the virtual address 202 may be mapped to another physical page address in the main memory 102. In these two situations, the Valid bit 214 of the PTE 210 remains set.

Conventionally, when the PTE 210 becomes invalid, which occurs when, for example, its Valid bit 214 is cleared or its page permission and/or virtual-physical mapping changes, the operating system in the computer system 100 instructs the CPU(s) to invalidate any TB entry that caches the virtual-physical address mapping in the PTE 210, so to avoid page permission mismatches, stale virtual-physical address mappings, or the like. Such invalidation is usually referred to as a "TB invalidate" or "TB flush." A TB flush is time-consuming and expensive, especially when multiple CPUs and, hence, multiple TBs, exist in a computer system.

Therefore, there exists a need for reducing the number of TB flushes that an operating system needs to issue in order to purge invalid virtual-physical address mapping information from TBs in a computer system.

SUMMARY OF THE INVENTION

The invention addresses the above-identified need by providing a method, computer system, and computer-readable medium for reducing the number of TB flushes that an operating system needs to issue in order to purge invalid virtual-physical address mapping information from TBs in a computer system.

One aspect of the invention utilizes the Access bit contained in a PTE to reduce the number of TB flushes and therefore improves the performance of a computer system. The Access bit is used to indicate whether the PTE has been used by the computer system. If the page table entry has been used by the computer system since it was last flushed, then at least one TB may contain an entry concerning the virtual-physical address mapping in the PTE. Only upon determining that the PTE is going to become invalid and that the Access bit in the PTE is set does the operating system of the computer system issue a TB flush to purge the invalid PTE information stored in a TB. Otherwise, if the Access bit is clear, even if the PTE becomes invalid, no TB flush is issued by the operating system of the computer system, because no TB can contain information concerning the PTE.

According to another aspect of the invention, upon determining that the PTE is to become invalid, an interlocked operation is used to update the PTE with valid content. The interlocked operation is to ensure that no processor may be simultaneously inserting a TB entry for this virtual address. If the interlocked operation fails, then the operating system can detect whether a CPU has accessed the PTE; and therefore, a TB flush may be required.

In accordance with a further aspect of the invention, the computer system includes at least one CPU and associated TB. The computer system includes memory. The CPU, coupled with the memory, executes computer-executable instructions that reduce the number of TB flushes issued for the computer system.

In summary, the invention reduces the number of TB flushes an operating system for a computer system needs to issue. The invention thus reduces the expenses associated with TB flushes and improves the performance of the computer system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
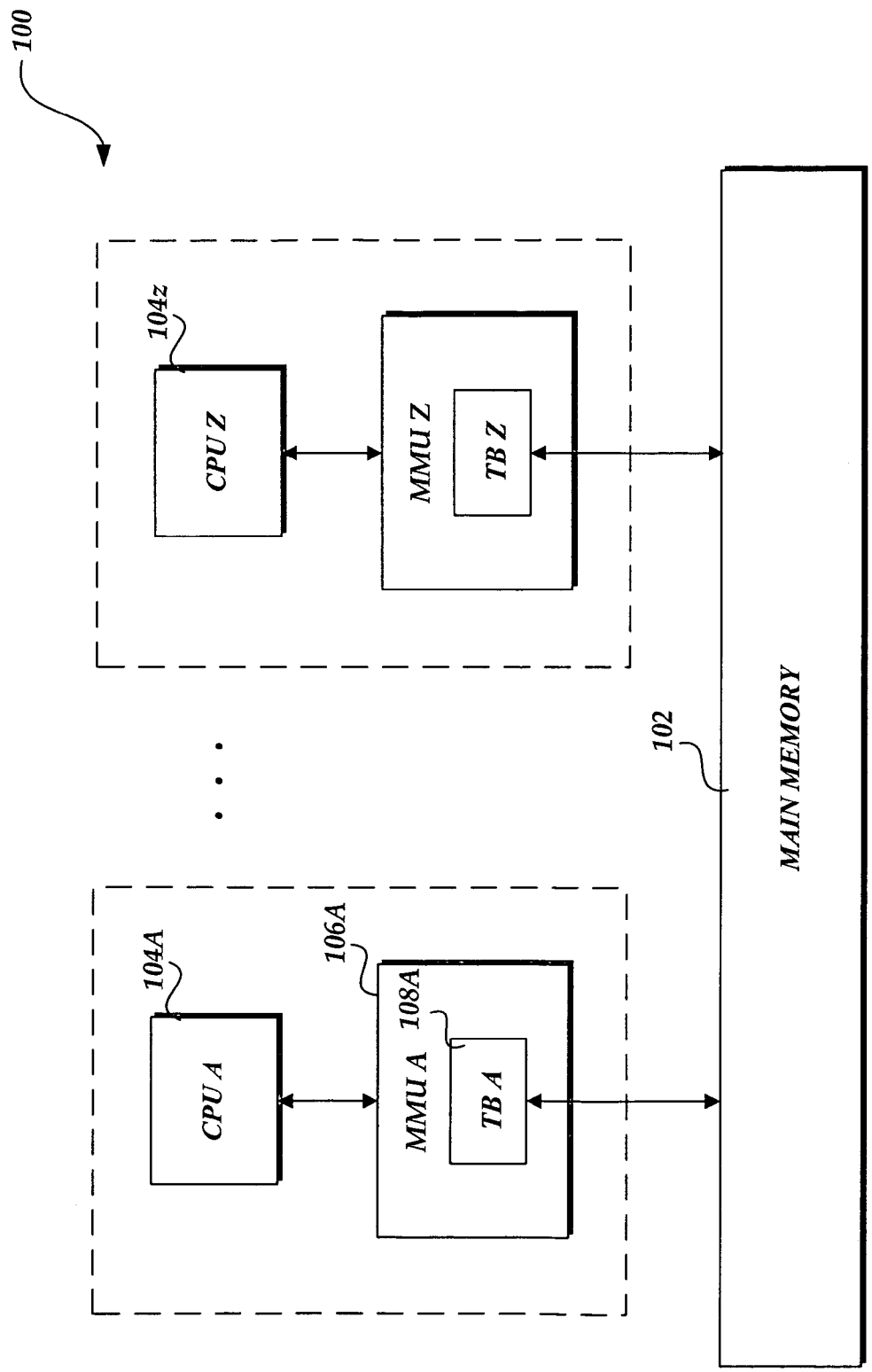
FIG. 1 is a block diagram illustrating a computer system including one or more CPUs and associated translation buffers.
Figure 2:
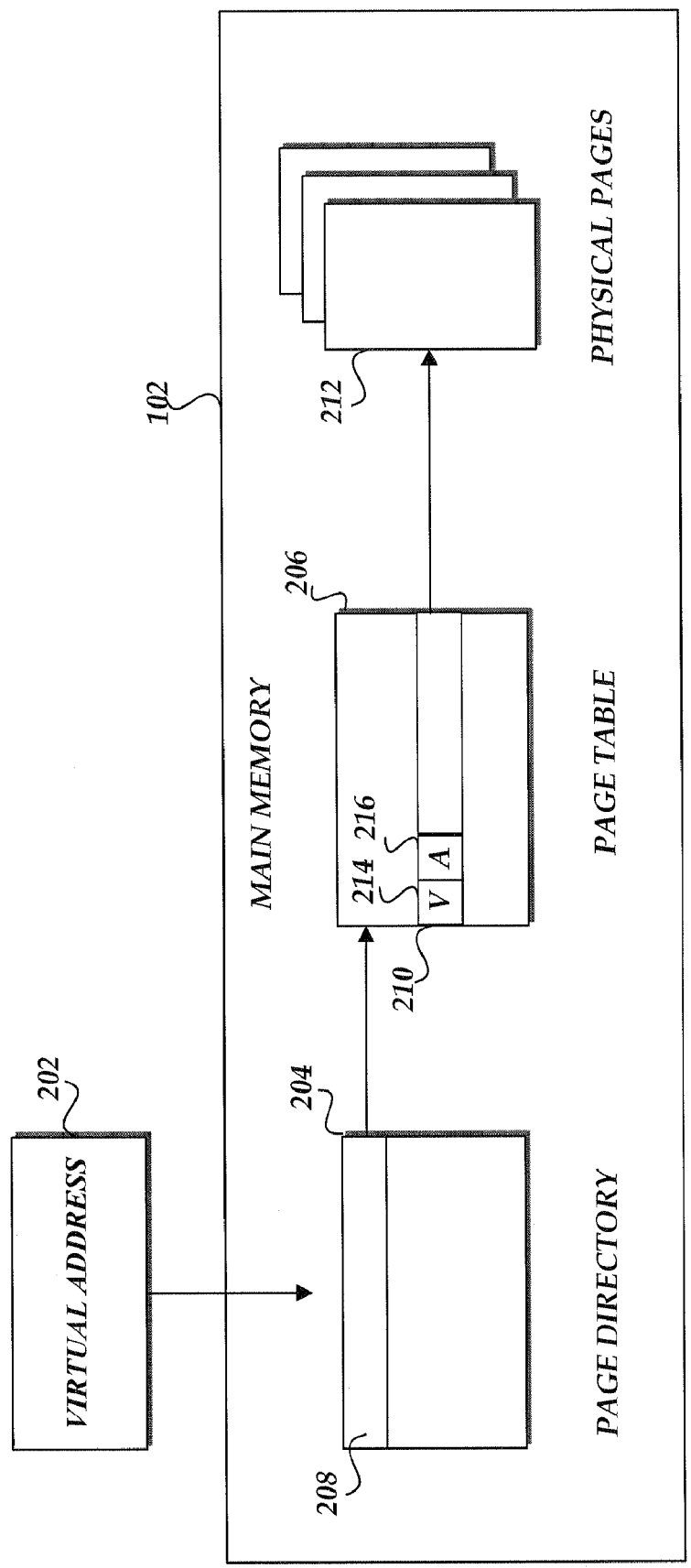
FIG. 2 is a block diagram illustrating mapping of a virtual address with its corresponding physical address, without the use of a translation buffer.
Figure 3:
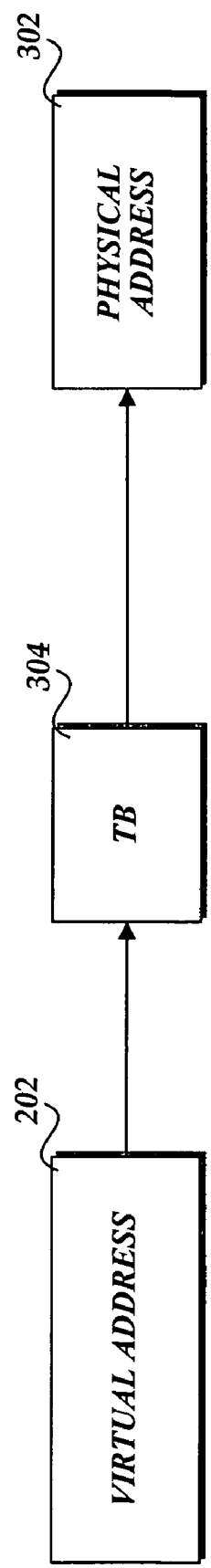
FIG. 3 is a block diagram illustrating mapping of a virtual address with its corresponding physical address, using a translation buffer.

Referring back to FIG. 2, the PTE 210 in the page table 206 includes an Access bit 216. The value of the Access bit 216 indicates whether the PTE 210 has been accessed by the computer system 100. If the Access bit 216 is set, then the PTE 210 has been accessed by the computer system 100; as a result, at least one TB in the computer system 100 may contain an entry corresponding to the PTE 210. On the other hand, if the Access bit 216 is clear, then no access to the PTE 210 has occurred; as a result, no TB in the computer system 100 contains an entry concerning the virtual address 202 and its corresponding physical page address 212.

Exemplary embodiments of the invention utilize the Access bit in a PTE to reduce the number of TB flushes an operating system of a computer system needs to issue. The following pseudo code illustrates one exemplary usage of the Access bit in a PTE by an exemplary embodiment of the invention.

```
if (PTE Access bit == 0) AND (InterlockedSwap
    (new PTE, old PTE) == success) {
    No TB Flush
}
else {
    TB Flush.
}
```

In the exemplary embodiment of the invention, when a PTE is to become invalid and the Access bit of the PTE is clear, an interlocked operation updates the old PTE content with the new and valid PTE content. As those of ordinary skill in the art will appreciate, an interlocked operation ensures atomic operation of a data structure, such as the PTE, that is shared by multiple processes or threads. The interlocked operation is to ensure that no CPU may be simultaneously inserting a TB entry for the virtual address contained in the PTE.

If the interlocked operation succeeds, then the PTE has not been accessed by a CPU in the computer system. Thus no corresponding TB entries exist in the TBs of the computer system and no TB flush is necessary.

On the other hand, as shown in the above pseudo code, if the Access bit of the PTE is set or the interlocked operation fails, a TB flush is required. When the Access bit of the PTE is set, at least one CPU in the computer system has accessed the PTE and therefore at least one TB in the computer system may contain an entry concerning the PTE; thus a TB flush is necessary. Meanwhile, when the interlocked operation fails, at least one CPU has accessed the PTE during the interlocked operation; hence a TB may contain the invalid virtual-physical memory mapping; therefore a TB flush may be necessary.

Consequently, in the exemplary embodiment of the invention, an operating system needs to issue a TB flush only when the Access bit of a PTE is set or an interlocked operation to update an invalid PTE fails.

While the preferred embodiments of the invention have been illustrated and described, it will be appreciated that various changes can be made therein without departing from the spirit and scope of the invention. For example, in some embodiments of the invention, the main memory 102 may contain a data structure not in the same form as the illustrated page table 210 or the illustrated PTE 210. Embodiments of the invention is applicable as long as the main memory 102 contains a data structure that includes information mapping a virtual address to a physical address and that includes an Access bit indicating whether the data structure has been accessed by a CPU.

The embodiments of the invention in which an exclusive property or privilege is claimed are defined as follows:

1. In a computer system having at least one data processor, an operating system and a translation buffer ("TB") associated with the at least one data processor, and a memory containing at least one Page Table Entry ("PTE") that maps a virtual address to a physical address, wherein the at least one PTE includes an Access bit and a Valid bit, wherein the value of the Access bit is set when content in the at least one PTE has been accessed, wherein the value of the Valid bit is cleared when content of the at least one PTE becomes invalid, and wherein the TB caches content of the at least one PTE if the at least one data processor has accessed the at least one PTE, a method of reducing the number of translation buffer flushes issued by the operating system, the method comprising:

flushing the TB only upon determining that the Access bit of the at least one PTE is set when the Valid bit of the at least one PTE is cleared.

2. The method of claim 1, wherein flushing the TB only upon determining that the Access bit of the at least one PTE is set when the Valid bit of the at least one PTE is cleared includes:

updating the at least one PTE using an interlocked operation; and flushing the TB only if the Access bit of the at least one PTE is set or the interlocked operation fails.

3. The method of claim 1, wherein the computer system includes a plurality of data processors and TB, one TB associated with each of the data processors, and the memory contains a plurality of PTEs, each of which maps a virtual address to a physical address, wherein each of the PTEs includes an Access bit whose value is set when content in the PTE has been accessed, wherein each of the PTEs includes a Valid bit whose value is cleared when content of the PTE becomes invalid, and wherein a TB caches content of a PTB if the related data processor has accessed the PTE, and wherein flushing a TB occurs only upon determining that the Access bit of the PTE is set when the Valid bit of the PTE is cleared.

4. The method of claim 3, wherein flushing a TB only upon determining that the Access bit of the PTE is set when the Valid bit of the PTE is cleared includes:

updating the PTE using an interlocked operation; and flushing the TB only if the Access bit of the PTE is set or the interlocked operation fails.

5. Apparatus for reducing the number of translation buffer flushes that an operating system of a computer system needs to issue, comprising:

at least one data processor and an associated translation buffer ("TB"); and a memory coupled to the at least one data processor, the memory containing at least one Page Table Entry ("PTE") that maps a virtual address to a physical address, wherein the at least one PTE includes an Access bit and a Valid bit, wherein the value of the Access bit is set when content in the at least one PTE has been accessed, wherein the value of the Valid bit is cleared when content of the at least one PTE becomes invalid, and wherein the TB caches content of the at least one PTE if the at least one data processor has accessed the at least one PTE;

wherein the at least one data processor flushes the TB only upon determining that the Access bit of the at least one PTE is set when the Valid bit of the at least one PTE is cleared.

6. The apparatus of claim 5, wherein the at least one data processor flushes the TB only upon determining that the Access bit of the at least one PTE is set when the Valid bit of the at least one PTE is cleared, by:

updating the at least one PTE using an interlocked operation; and flushing the TB only if the Access bit of the at least one PTE is set or the interlocked operation fails.

7. The apparatus of claim 5, wherein the computer system comprises:

a plurality of data processors, each having an associated TB; and the memory contains a plurality of PTEs, each of which maps a virtual address to a physical address, wherein each of the PTEs includes an Access bit whose value is set when content in the associated Pm has been accessed, wherein each of the PTEs includes a Valid bit whose value is cleared when content of the associated PTE becomes invalid, and wherein the TB caches content of the PTE if the associated data processor has accessed the PTE;

wherein the associated data processor flushes a TB only upon determining that the Access bit of the PTE is set when the Valid bit of the PTE is cleared.

8. The apparatus of claim 5, wherein the associated at least one data processor flushes a TB only upon determining that the Access bit of the at least one PTE is set when the Valid bit of the at least one PTE is cleared by:

updating the at least one PTE using an interlocked operation; and flushing the TB only if the Access bit of the at least one PTE is set or the interlocked operation fails.

9. A computer-readable medium containing computer-executable instructions that, when executed in a computer system having at least one data processor, an operating system and a translation buffer ("TB") associated with the at least one data processor, and a memory containing at least one Page Table Entry ("PTE") that maps a virtual address to a physical address, the at least one PTE including an Access bit and a Valid bit, wherein the value of the Access bit is set when content in the at least one PTE has been accessed, wherein the value of the Valid bit is cleared when content of, the at least one PTE becomes invalid, and the TB caching the content of the at least one PTE if the at least one data processor has accessed the at least one PTE, reduces the number of translation buffer flushes that the operating system needs to issue by flushing the TB only upon determining that the Access bit of the at least one PTE is set when the Valid bit of the at least one PTE is cleared.

10. The computer-readable medium of claim 9, wherein the computer-executable instructions, when executed in the computer system, flush the TB only upon determining that the Access bit of the at least one PTE is set when the Valid bit of the at least one PTE is cleared, by:

updating the at least one PTE using an interlocked operation; and flushing the TB only if the Access bit of the at least one PTE is set or the interlocked operation fails.

11. The computer-readable medium of claim 9, wherein the computer-executable instructions, when executed in a computer system having a plurality of data processors, each having an associated TB, and a memory comprising a plurality of PTEs, each of which maps a virtual address to a physical address, each of the plurality of PTEs including an Access bit whose value is set when content in the associated PTE has been accessed, each of the plurality of PTEs including a Valid bit whose value is cleared when content of the associated PTE becomes invalid, and the TB caching the content of a PTE if the associated data processor has accessed the PTE, reduces the number of translation buffer flushes that the operating system needs to issue by flushing a TB only upon determining that the Access bit of the PTE is set when the Valid bit of the PTE is cleared.

12. The computer-readable medium of claim 9, wherein the computer-executable instructions, when executed in the computer system, flush a TB only upon determining that the Access bit of the at least one PTE is set when the Valid bit of the at least one PTE is cleared, by:

updating the at least one PTE using an interlocked operation; and flushing the TB only if the Access bit of the at least one PTE is set or the interlocked operation fails.

* * * * *

UNITED STATES PATENT AND TRADEMARK OFFICE
CERTIFICATE OF CORRECTION

PATENT NO. : 7,496,730 B2
APPLICATION NO. : 11/107013
DATED : February 24, 2009
INVENTOR(S) : Landy Wang et al.

It is certified that error appears in the above-identified patent and that said Letters Patent is hereby corrected as shown below:

In column 5, line 43, in Claim 3, delete "PTB" and insert -- PTE --, therefor.

In column 6, line 24, in Claim 7, delete "Pm" and insert -- PTE --, therefor.

Signed and Sealed this
Third Day of May, 2011

David J. Kappos
*Director of the United States Patent and Trademark Office*